Patented Nov. 5, 1935

2,019,529

UNITED STATES PATENT OFFICE 2,019,529

AMINOBENZOTHIAZOLE COMPOUND

Max Engelmann, Wilmington, Del., assignor to E. I. du Pont de Nemours & Company, Wilmington, Del., a corporation of Delaware No Drawing. Application September 10, 1931,
Serial No. 562,191

13 Claims. (Cl. 260—44)

This invention relates to new Bz-alkoxy-2-aminobenzothiazoles. More particularly, this invention deals with substituted aminobenzothiazoles having the general formula

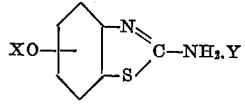

in which X represents one or more saturated alkyl or a saturated cyclic hydrocarbon nucleus which contains three or more carbon atoms, and Y may be zero or an acid, and in which the oxygen may be attached to any free position in the benzene ring.

The new compounds which constitute my invention are crystalline bodies of basic character which form stable salts with acids, such as hydrochloric and sulfuric, and which possess valuable local anesthetizing properties coupled with a most desirable lack of toxic properties.

The following examples will illustrate my invention, it being understood that the invention is not limited to the particular proportions, reacting conditions or materials embodied in the examples nor to the particular modes of preparing the compounds.

Throughout the specification and claims the chemical compounds mentioned have been numbered in accordance with the customary numbering scheme which is as follows:

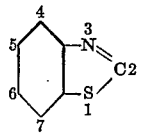

as proposed by Bogert in the Journal of American Chemical Society, vol. 44, page 826.

Example I

Forty-five parts of para-isobutyloxyphenylthiourea described in Berichte der Deutchen Chem. Gesellschaft, vol. 34, page 1945, are suspended in 150 parts of chloroform and 32 parts of bromine are slowly added. The thiourea derivative dissolves and soon afterwards the separation of a crystalline compound starts. After standing for two or three hours, the 6-isobutyloxy-2-aminobenzothiazole hydrobromide is filtered off, dissolved in water, filtered from a small amount of an insoluble residue and precipitated with ammonia. The free thiazole base is recrystallized from xylene. It is soluble in alcohol, ether, benzene and diluted acids, and insoluble in water.

The melting point of the isobutyloxyaminobenzothiazole is 140° C. The hydrochloride of the thiazole compound is prepared by dissolving the base in alcohol, adding a slight excess of hydrochloric acid and precipitating the hydrochloride with ether. It is a white crystalline salt with a melting point of 171° C.

Pharmacological tests have shown that this aminothiazole compound is an unusually effective local anesthetic which is much more effective than cocaine, having at the same time a much lower toxicity.

Example II

Forty-eight parts of para-isoamyloxyphenylthiourea (melting point 131° C.) are suspended in 150 parts of carbon tetra chloride. Twenty-seven parts of sulfuryl chloride are added. The sulfuryl chloride transiently dissolves the thiourea and soon afterwards the precipitation of the thiazole compounds in the form of the hydrochloride starts. After standing for a few hours, the precipitate is filtered off, dried, and dissolved in water and the free base precipitated with diluted ammonia. The 6-isoamyloxy-2-aminobenzothiazole is recrystallized from xylene. It has a melting point of 122° C. It is very soluble in alcohol, ether, benzene, acetone, and practically insoluble in water. The hydrochloric salts can easily be obtained by treating the free base with hydrochloric acid. It has a melting point of 135° C. It is very soluble in water, alcohol, and acetone. It possesses an unusual local anesthetic effect.

Example III 52 parts of para-isopropyloxyphenylthiourea (melting point 141° C.) are suspended in 150 parts of chloroform. 42 parts of bromine are slowly added. After a few hours, the chloroform is evaporated on a water bath and the oily residue extracted with 1,000 parts of warm water. The water solution contains the isopropyloxy-aminobenzothiazole as hydrobromic salt. The free base is precipitated with a small excess of ammonia as a white crystalline product. It is recrystallized from toluol or boiling water and has a melting point of 135° C. The isopropyl-oxyaminobenzothiazole is very soluble in alcohol and diluted hydrochloric acid. It is only slightly soluble in cold water. It possesses marked local anesthetic properties.

Example IV 56 parts of p-n-butyloxphenylthiourea (melting point 154° C.) are suspended in 200 parts of chloroform. The addition of 42 parts of bromine brings the thiourea into solution converting it to the aminobenzothiazole compound. After evaporating the chloroform, the hydrobromic salts of N-butyloxyaminobenzothiazole remains as an oily compound. The residue is extracted with 1500 parts of warm water and the free base is precipitated with a small excess of sodium hydrate solution. The thiazole compound is recrystallized from toluol and has a melting point of 121° C. It is very soluble in alcohol, toluol, and benzol. It is not very soluble in cold water. The hydrochloric salt and the sulfuric acid salt are soluble in water. The compound is a valuable local anesthetic.

*Example V*

22 parts of ortho-n-butyloxyphenylthiourea (melting point 114° C.) are suspended in 100 parts of methylene dichloride and 16 parts of bromine diluted with 20 parts of methylene dichloride are slowly added. The thiourea derivative goes into solution. After heating for a short time on a water bath, the precipitation of the hydro-bromic salt of the 4-ortho-n-butyloxy-2-aminobenzothiazole starts and can be completed after cooling with the addition of ether. After recrystallizing from alcohol, the hydrobromic salt of the thiazole derivative melts at 166-167° C. The melting point of the free base, which can be prepared by adding ammonia to the water solution of the hydrobromic salt, is 142-143° C. The free base is very soluble in alcohol and acetone, less soluble in toluol and petrol ether, and practically insoluble in water. The halide salts are very soluble in water. Instead of starting with ortho-n-butyloxy-phenylthiourea, the corresponding ortho-iso-butylorthoisoamyl, orthoisopropyl- or other ortho alkoxy phenyl thioureas in which the alkoxy group contains three or more carbon atoms, may be used.

My investigations with these new compounds have disclosed that the property of being a local anesthetic is possessed by alkoxy derivatives of aminobenzothiazoles in which the alkyl substituent contains three or more carbon atoms. I have tested the methoxy derivotive and found it to possess no anesthetic properties whatsoever, and similiar tests with the ethoxy derivatives have disclosed that they possess such slight properties as to be negligible. I have found that propyl, isopropyl, allyl, butyl, and hexyl oxyaminobenzothiazoles possess anesthetizing properties similar to the isoamyl and isobutyl. I have found, moreover, that the anesthetizing properties are not limited to straight chain alkyl nuclei, but that other saturated hydrocarbon nuclei, such as cyclohexane and similar saturated cyclic hydrocarbons, may be used as substituents in lieu of the straight chain alkyl groups. I have found, moreover, that the position of the substituents need not be lifited to the para position with respect to the thiazolic nitrogen, but that the substituents may be placed in any free position in the benzene ring.

On the first page of my specification, I have given in the formula the normal thiazole ring structure, namely,

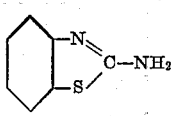

It is to be understood that my invention includes not only the normal thiazole but the tautomeric form having the following structure:

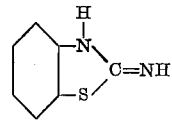

All of my new compounds are characterized by being difficultly soluble or substantially insoluble in water when the compounds are in the form of the free base. When subjected to dilute acid, and when in the form of the normal acid salt the compounds are readily soluble in water. I prefer, however, not to treat the free bases with too much acid because an excess of acid is apt to reduce the solubility of the salts. My new compounds are all characterized by being efficient local anesthetics and by having toxicity considerably less than that of cocaine.

Since many embodiments of this invention, differing widely in one or more respects, may be made without departing from the spirit of my invent ion, it is to be understood that I do not limit myself to the foregoing examples or description except as indicated in the following claims.

I claim:

1. Aminobenzothiazoles of the general formula:

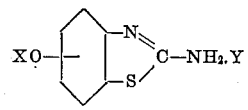

in which X represents a saturated alkyl nucleus which contains three or more carbon atoms or saturated cyclic hydrocarbon nucleus which contains three or more carbon atoms, and Y represents nothing or an acid, said products being characterized by being difficultly soluble in water when in the form of the free base but readily soluble in water when Y is hydrochloric acid, said products being further characterized by possessing greater local anesthetic properties yet less toxicity than cocaine.

2. Aminobenzothiazoles of the general formula:

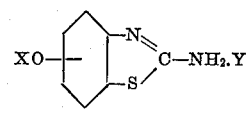

in which X represents a saturated alkyl nucleus containing three or more carbon atoms, and Y represents nothing or an acid, said products being characterized by being difficultly soluble in water when in the form of the free base but readily soluble in water when Y is hydrochloric acid, said products being further characterized by possessing greater local anesthetic properties yet less toxicity than cocaine.

3. The product 6-isobutyloxy-2-amino-benzothiazole which as a free base is soluble in alcohol, ether and benzene, and possesses a melting point of about 140° C., and which is insoluble in water and which forms as the hydrochloride a white crystalline salt soluble in water and having a melting point of about 171° C., and further characterized by being an effective local anesthetic having less toxicity than cocaine.

4. The product 6-isoamyloxy-2-amino-benzothiazole which as a free base is soluble in alcohol, ether and benzene, and possesses a melting point of about 122° C., and which is insoluble in water and which forms as the hydrochloride a white crystalline salt soluble in water and having a melting point of about 135° C., and further characterized by being an effective local anesthetic having less toxicity than cocaine.

5. 6-isoamyloxy-2-amino-benzo-thiazole hydrochloride having, in one of its tautomeric forms, the formula

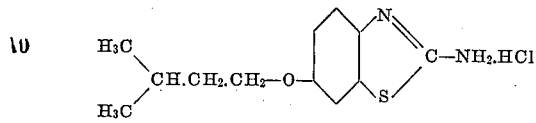

and which is soluble in water, ethyl alcohol and acetone and which has a melting point of 135° C.

6. Aminobenzothiazoles of the general formula:

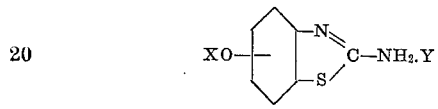

in which X represents a saturated alkyl nucleus containing three or more carbon atoms, and Y is a mineral acid, said products being readily soluble in water and being further characterized by possessing greater local anesthetic properties yet less toxicity than cocaine.

7. A compound of the amino benzothiazole series, having in the form of its free base the following general formula:

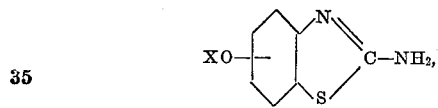

wherein X stands for an alkyl or cycloalkyl radical of more than two carbon atoms.

8. A Bz-alkoxy-2-amino-benzo-thiazole compound of the group consisting of the free base and its salts and having more than two carbon atoms in the alkoxy group.

9. A Bz-alkoxy-2-amino-benzo-thiazole, having more than two carbon atoms in the alkoxy group.

10. A salt of Bz-alkoxy-2-amino-benzo-thiazole having more than two carbon atoms in the alkoxy group.

11. The process of producing a Bz-alkoxy-2-amino-benzothiazole compound having more than two carbon atoms in the alkoxy group, which comprises reacting with a halogenating agent upon the corresponding Bz-alkoxyphenyl-thiourea.

12. The process of producing a Bz-alkoxy-2-amino-benzothiazole compound having more than two carbon atoms in the alkoxy group, which comprises suspending the corresponding alkoxy-phenyl-thiourea in an inert organic solvent, and adding a halogenating agent.

13. A Bz-alkoxy-2-amino-benzothiazole compound which in the form of free base corresponds to the formula

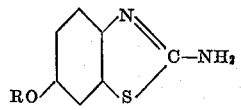

wherein R stands for an isoalkyl radical having not less than 4 and not more than 5 carbon atoms.

MAX ENGELMANN.